(12) United States Patent
Circenis et al.

(10) Patent No.: US 7,143,411 B2
(45) Date of Patent: Nov. 28, 2006

(54) CAPPING PROCESSOR UTILIZATION

(75) Inventors: Edgar Circenis, Loveland, CO (US); Patrick Allaire, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 799 days.

(21) Appl. No.: 10/097,428

(22) Filed: Mar. 15, 2002

(65) Prior Publication Data

US 2003/0187531 A1 Oct. 2, 2003

(51) Int. Cl.
*G06F 9/46* (2006.01)

(52) U.S. Cl. .................. 718/102; 718/103; 718/104

(58) Field of Classification Search ............... 718/100, 718/102, 103, 104; 707/10; 713/1, 300
See application file for complete search history.

(56) References Cited

U.S. PATENT DOCUMENTS

| | | | |
|---|---|---|---|
| 4,503,495 A * | 3/1985 | Boudreau ................ 710/241 |
| 5,010,482 A | 4/1991 | Keller et al. |
| 5,301,324 A * | 4/1994 | Dewey et al. ............ 718/105 |
| 5,654,905 A * | 8/1997 | Mulholland et al. ...... 702/186 |
| 5,835,767 A | 11/1998 | Leigh |
| 6,009,452 A * | 12/1999 | Horvitz ................... 718/102 |
| 6,016,531 A * | 1/2000 | Rixner et al. ............ 711/118 |
| 6,049,798 A * | 4/2000 | Bishop et al. ............. 707/10 |
| 6,438,704 B1 * | 8/2002 | Harris et al. ............. 713/502 |
| 6,442,706 B1 * | 8/2002 | Wahl et al. ................ 714/6 |
| 6,578,141 B1 * | 6/2003 | Kelley et al. .............. 713/1 |
| 6,668,269 B1 * | 12/2003 | Kamada et al. .......... 718/103 |
| 6,779,182 B1 * | 8/2004 | Zolnowsky ............... 718/103 |
| 2002/0194509 A1 * | 12/2002 | Plante et al. ............. 713/300 |

FOREIGN PATENT DOCUMENTS

| EP | 320329 A2 * | 6/1989 |
| EP | 1139305 A2 * | 10/2001 |
| EP | 1255208 A1 * | 11/2002 |
| GB | 2294566 A * | 5/1996 |
| GB | 2344265 A * | 5/2000 |
| WO | WO01/14961 A | 3/2001 |

* cited by examiner

*Primary Examiner*—Meng-Ai T. An
*Assistant Examiner*—Lilian Vo

(57) ABSTRACT

An apparatus, system, and method allow for capping processor utilization in a computer system. The processors are typically central processing units (CPUs) under control of a system scheduler. The system scheduler controls which of the CPUs will run specific processes. The processes may run according to a predefined priority assigned to each of the processors. A processor bandwidth waster includes a software routine that operates as an infinite loop in one or more of the CPUs. The bandwidth waster may have the highest priority of any process in the computer system such that the bandwidth waster always runs on the CPUs unless a specific action is taken to turn off, or stop, the bandwidth waster. Data are gathered from the CPUs, including time of operation of any bandwidth waster, and the gathered data are used to compute a bill for operation of the computer system.

32 Claims, 6 Drawing Sheets

CAPPING PROCESSOR UTILIZATION

TECHNICAL FIELD

The technical field is use control of processor assets.

BACKGROUND

Many current computer customers purchase or lease computer systems having multiple processors with the intention that the computer system be sized to meet expected processor demand. As a result, on the one hand, the customer's computer system may operate in an under-utilized scenario for a significant time, and the customer may thus be paying for excess capacity. On the other hand, the customer's computer system may become overloaded, when, for example, actual demand exceeds a peak value that the customer used in sizing the computer system, when the customer's computing needs expand over time, or when a component failure occurs. Current solutions to this mismatch between actual processor capacity and needed capacity include a "pay-per-use" system wherein the customer pays a reduced price to buy a computer system with a given number of processors while activating only some of the processors. The customer then is able to activate the inactive CPUs at a later time, and is charged at the time of activation for the additional processor capacity. In this manner the customer is able to flexibly scale up its computing power as the customer's needs change.

SUMMARY

Many current computer systems include multiple processors. The processors execute processes, and processes consume processor resources or processor time. Processor time may be measured in cycles, ticks (where a tick may be a segment of a second—in a typical configuration each second is 100 ticks), real time (e.g., seconds), by means of a time stamp, or other time metric. When a process is not executing on a processor, the processor may be considered idle.

The amount of processor resources or processor time devoted to process execution can be determined. The amount of processor resources or processor time devoted to execution of a specific process can also be determined. These two quantities are not always the same value because in any time period, a process may migrate from one processor to another processor. Furthermore, some processes executing on a processor may not contribute to that processor's utilization, or value. A computer system operator would only want to pay for processor time devoted to providing utility (value). These concepts are used in an apparatus and by a method to cap processor utilization (value). The thus-capped processor utilization may be used as a basis for billing the computer system operator (or owner/lessee).

A computer system incorporates means for controlling access and usage (or utilization) of one or more processors in the computer system. Although the typical computer system includes multiple processors, the means for controlling access and usage may be applied to a single processor computer system, or may be applied on a processor-by-processor basis in the multi-processor computer system. The means may include hardware and software features. The means may operate according to specified steps of a specific algorithm. The processors are typically central processing units (CPUs) under control of a system scheduler. The system scheduler controls which of the CPUs will run specific processes. The processes may run according to a predefined priority assigned to each of the processors. A processor bandwidth waster (cycle waster) may be a software routine or process that operates as an infinite loop in one or more of the CPUs. The cycle waster process when executing consumes processor resources or processor time without providing value. The CPUs may also have executing processes that provide value. These processes include application processes (for example, a billing system, a database, or other application process) and system processor (for example, a login process, a mail daemon, and other system processes). The cycle waster process may have the highest priority of any process in the computer system such that the cycle waster process always runs on the CPUs unless a specific action is taken to turn off, or stop, the cycle waster process.

In the computer system, processor utilization may be defined as the amount of processor resources or processor time consumed by processes executing on a processor. That is, processor utilization may be the amount of time the processor spends doing useful work. However, as noted above, cycle waster processes are designed not to do useful work. Thus, in the computer system with cycle waster processes, processor utilization may be re-defined to refer to the amount of processor resources or processor time consumed by only the non-cycle waster processes. In addition to processor resources or processor time consumed by cycle waster processes, processor idle time may not be included when determining processor utilization.

In an embodiment, the processor utilization is controlled or capped by an apparatus having a scheduler coupled to each of one or more CPUs, a data table coupled to the scheduler, wherein the data table identifies one or more application processes, and one or more cycle waster processes, and wherein the scheduler schedules cycle waster processes and the application processes to operate on each of the one or more CPUs. In one alternative of the embodiment, the scheduler binds a cycle waster process to one or more specific CPUs. In an another alternative of the embodiment, the scheduler assigns a cycle waster process to the CPUs ad hoc. In the embodiments, each of the cycle waster processes has a first priority of operation and each of the application processes has a second priority of operation, where the first priority is higher than the second priority, where the scheduler assigns a process to a CPU based on a priority of the process, and where the cycle waster process is always scheduled ahead of an application process.

Because a CPU may run a cycle waster process continuously, in order to run an application program, the cycle waster process is turned off. The cycle waster process may be turned off automatically, based, for example, on remaining CPU capacity.

Using the cycle waster—configured system and method, a client can limit, or cap, CPU utilization. In a system with eight CPUs, for example, the client may desire to cap CPU utilization at 75 percent. To achieve this objective, two cycle waster processes could be installed on the system. The two cycle waster processes may be bound to specific CPUs, or may be assigned to CPUs ad hoc. In either embodiment, operation of the system at greater than 75 percent of CPU capacity would require that one or both cycle waster processes be turned off.

In order to ensure accurate billing for CPU utilization, a data provider module gathers data for each of the CPUs, wherein the data are used to determine a charge for operation of a processor or the system. The percentage utilization data includes cycle waster process run time and optionally, number of CPUs, wherein each of the one or more CPUs runs an application process, a cycle waster process, or is idle. The thus gathered data may be provided to a remote location. The remote location computes an average utilization per CPU (for multiple CPU computer systems), which serves as a basis for billing a client.

DESCRIPTION OF THE DRAWINGS

The detailed description will refer to the following drawings, wherein like numerals refer to like elements, and wherein.

DETAILED DESCRIPTION

Figure 1:
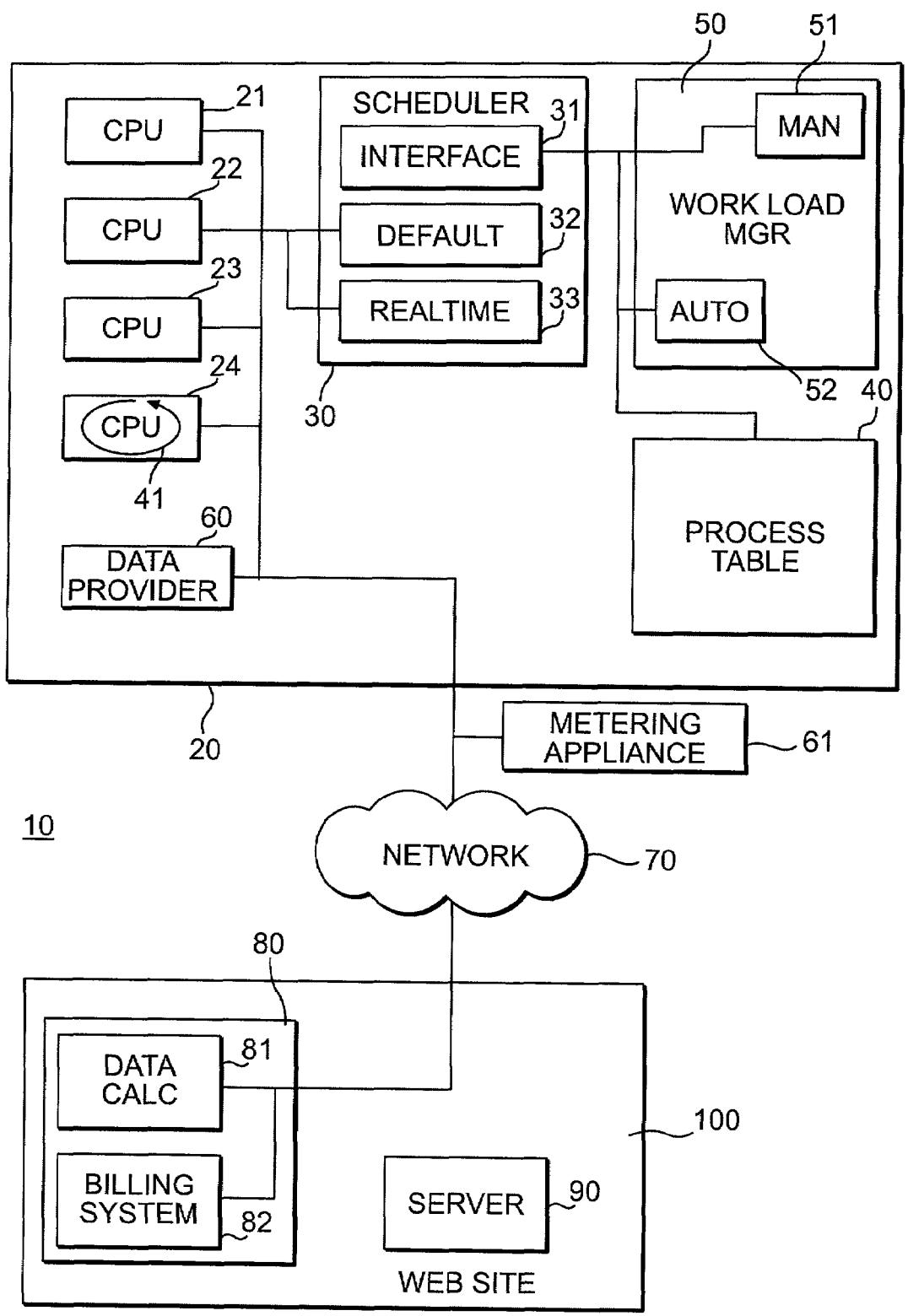
FIG. 1 is a block diagram of a system that uses a cycle waster process to control utilization of processors in a computer system.

Rapid advancements in computer processing capabilities and an ever increasing need for maximum computing power have led to deployment of computer systems in which customers purchase or lease computer hardware and software on a pay per use basis. In a typical pay per use system, the customer pays for actual processor (e.g., central processor unit (CPU)) utilization based on a number of active processors, the percent utilization of the active processors, or some combination of the two. This pay per use system allows the customer to control the processor capacity that the customer receives from the computer system and to be able to control the amount the customer periodically pays for the computer system. Billing based on the number of active processors gives the customer the ability to limit the number of active processors (and hence the bill) by deactivating processors. However, this pay per use system has the disadvantage that processor deactivation (or activation) is a potentially disruptive activity that can interfere with application execution and other processes and technologies that may be present on the computer system.

Furthermore, while this pay per use system more closely accounts for the value that a customer receives from the computer system, the pay per use system does little to cap overall processor utilization. For example, a computer system with four CPUs can usually reach 100 percent utilization on all four processors at boot time or at times of heavy load, even if the customer does not want the system to reach 100 percent CPU utilization. Controlling percent utilization usually entails use of sophisticated software that measures utilization of individual processes or groups of processes and adjusts the scheduling of those processes to meet the customer's objectives.

To provide a flexible way of capping processor utilization, a cycle waster apparatus, or system and a corresponding method, allow processors to be treated as inactive by the execution of a process that effectively wastes 100 percent or close to 100 percent of the processors' bandwidth. In the discussion that follows, the processors in the computer system will be generically referred to as central processor units (CPUs). However, any processor may be controlled with the disclosed apparatus, system, and method.

System processor utilization is calculated by first measuring percent utilization of all CPUs on the computer system, and then adjusting this number by subtracting CPU utilization of any bandwidth wasting process executing on the computer system. The apparatus, system, and method use cycle waster processes that may be used on any CPU in the computer system to waste that CPU's bandwidth or cycles. The cycle waster process employs a tight infinite loop, which causes constant use of CPU cycles. A combination of scheduling priority and tight infinite loop effectively prevents other processes from being scheduled on the CPU. A cycle waster process can either check for other cycle waster process that are bound to CPUs and then bind to another CPU, or can take as an argument on cycle waster process start up, a CPU to bind to. In an alternate embodiment, by not binding to a particular CPU, the cycle waster processes are free to waste CPU resources on any CPUs, but maybe less efficient as the cycle waster processes migrate from CPU to CPU.

In the discussion that follows, CPU utilization will generally be described with respect to a computer system. However, the concepts of capping processor utilization and wasting processor bandwidth can be applied to a single processor computer system and to individual processors (or groups of processors) in a multiple processor computer system. In addition, reference to wasting processor bandwidth includes wasting processor (CPU) cycles, real time, or any other processor time metric or other processor resource. Furthermore, reference to CPU utilization should be understood to mean CPU resources (or time) spent doing useful work (for example, executing an application process) and does not include CPU resources consumed by a cycle waster process, and idle CPU time. Two general methods are available for determining CPU utilization: (1) summing CPU bandwidth consumed by application processes, and (2) subtracting CPU bandwidth consumed by the cycle waster processes from total CPU bandwidth.

The number of cycle waster processes to run may be determined by a customer and stored in a configuration file in an operating system (OS). The configuration file may be read by a system start up script when the computer system boots up and an appropriate number of cycle waster process may be started, with each cycle waster process attached to a different CPU.

FIG. 1 illustrates a system 10 that uses cycle waster processes to waste CPU bandwidth. The system 10 includes a computer 20 coupled to a usage and accounting system 80 by a network 70. The system 80 may be located at Internet Web site 100. The Web site 100 may include other systems and components such as a Web server 90. The computer 20 includes a number of processors or CPUs. As shown, the computer 20 includes four CPUs 21–24. However, the computer 20 could include more or less CPUs. The CPUs 21–24 are coupled to a scheduler 30. The scheduler 30 includes a default scheduler 32, a real time scheduler 33 and an interface unit 31. The interface unit 31 couples the scheduler 30 to a work load manager 50. The work load manager 50 includes an automatic control 52 and a manual control 51. The automatic control 52 can be programmed to provide instructions to the scheduler 30 for scheduling processes to run on the CPUs 21–24. The manual control 51 may allow a human user to interface with the scheduler 30 to control operation of the CPUs 21–24. A part of the scheduler 30 is a process table 40. The process table 40 includes process information for each of the cycle waster processes in the computer 20, as well as process information for other processes that may run on the CPUs 21–24. The process table 40 will be described in more detail later.

Coupled to the CPUs 21–24 is a data provider 60, and an optional metering appliance 61. The data provider 60 and, optionally the metering appliance 61, are used to collect CPU utilization data and other data from the CPUs 21–24. Operation of the data provider 60 and the metering appliance 61 will be described in more detail later. The data collected by the provider 60 may be transmitted to the system 80 over the network 70. The data may be passed to the system 80 by way of an e-mail message, for example. Alternately, the data may be passed to the Web site 100 for entry into a database, such as the usage and accounting system 80. The network 70 may be any digital network or any network capable of communicating between computers. For example, the network 70 may be an Internet. The system 80 includes a data calculator 81 and a billing system 82. The data calculator 81 uses data provided by the data provider 60 to generate statistical information used by the billing system 82 to compute bills or invoices that are ultimately provided to the customer.

In the computer 20 shown in FIG. 1, the CPU 24 is shown with a cycle waster 41 in operation. The CPUs 21–23 are running other application processes. The configuration of the system 10 shown in FIG. 1 is by way of example and is not meant to be limiting. Other configurations of the system 10 may also be used to control (cap) processor utilization by wasting bandwidth, including converting the functions of one or more of the components 21–24, 30, 40, 50 and 60 into a single component or chip, for example.

Figure 2:
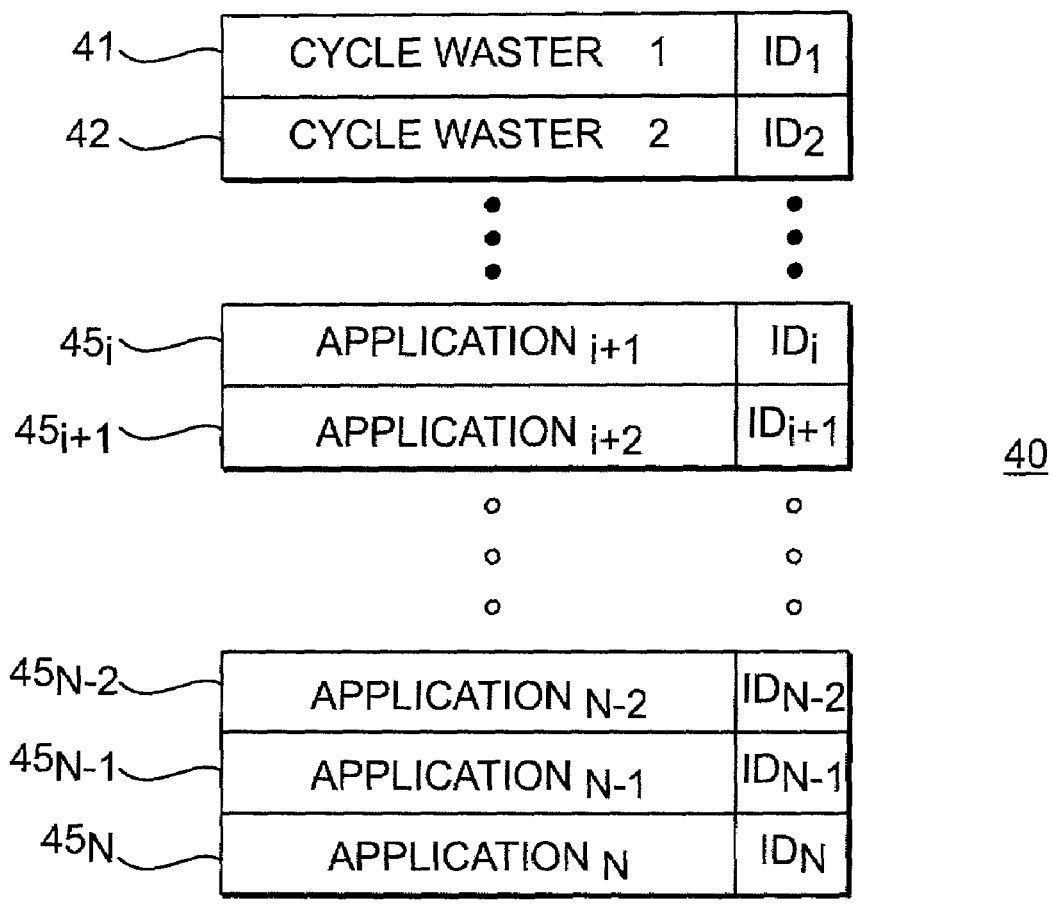
FIG. 2 illustrates a process table used with the system of FIG. 1.

FIG. 2 illustrates the process table 40 that is used to provide information to control access to the cycle waster processes and other processes that run on the computer 20. As shown in FIG. 2, the process table 40 includes two cycle waster processes 41 and 42, with each of the two cycle waster processes 41, 42 available for attachment to the CPUs 21–24. As noted above, a cycle waster process may be bound to a CPU. In an alternative embodiment, the scheduler 30 can assign the cycle waster processes 41, 42 to the CPUs 21–24 on an ad hoc basis. Each of the cycle waster process table entries includes a process name, and identification number, which are used to lookup additional information in the process table 40 about the process, such as where in the computer system 20 the cycle waster process is operating. Each of the cycle waster processes 41, 42 may be assigned a priority number and schedule information. Each time a new cycle waster process starts, a new identification number is assigned to the cycle waster process and is recorded in the process table 40. The identification number of the cycle waster process or its name can then be used by the data provider 60 to verify that a cycle waster process is operating. Use of the identification number and the data provider 60 will be described in more detail later.

Each of the cycle waster processes 41, 42 is in effect assigned a highest priority in the process table 40. By assigning each cycle waster processes 41, 42 a higher priority than given to other processes, the cycle waster processes 41, 42 are guaranteed to operate on the CPUs to the exclusion of other application processes. As a result, each CPU operating a cycle waster processes 41, 42 will typically have close to 100 percent of its cycles utilized by a cycle waster 41, 42. The customer may not be charged for CPU utilization attributed to a cycle waster process 41, 42.

The process table 40 also includes other processes $45_1$–$45_n$. The processes $45_i$–$45_n$ may be various application processes that may operate on one or more of the CPUs 21–24. The processes $45_i$–$45_n$, also include a process name and identification number but may have a priority lower than the priority of any of the cycle waster processes 41, 42.

In an embodiment, to ensure each of the cycle wasters 41, 42 are run continually, the cycle waster processes 41, 42 are scheduled using the real time scheduler 33. Other processes, such as the applications processes, $45_i$–$45_n$, may be scheduled to run by the default scheduler 31. The default scheduler 31 may use a round robin or time-based scheduling scheme, for example, that results in the applications processes $45_i$–$45_n$ sharing CPU resources with other application processes $45_1$–$45_n$, using the same scheduler. Other schemes may also be employed to ensure the cycle waster processes 41, 42 operate continually on a priority basis.

Returning to FIG. 1, the data provider 60 was described as responsible for collecting data about the CPUs 21–24 related to CPU utilization and processes executing on the CPUs. The data provider 60 periodically collects data about all or some of the CPUs in the computer 20. The collection period may be adjusted to maximize data accuracy and minimize disruption of CPU operation. The data provider 60 may be implemented as an active or a passive device. In a passive embodiment, the data provider 60 interface may be a Simple Network Management Protocol (SNMP) agent. Other processes can contact the data provider 60 using SNMP protocols to obtain information about the CPUs 21–24 that the data provider 60 provides. Other interfaces may include Web-Based Enterprise Management (WBEM), Desktop Management Interface (DMI) and Hypertext Transport Protocol (HTTP). In an active embodiment, the data provider 60 is an active agent that periodically gathers information about the CPUs 21–24 and transmits the gathered information to the system 80. The information may be transmitted by e-mail, HTTP or secure HTTP (HTTP/S). The active and passive embodiments of the data provider 60 are illustrated in FIG. 3.

Figure 3:
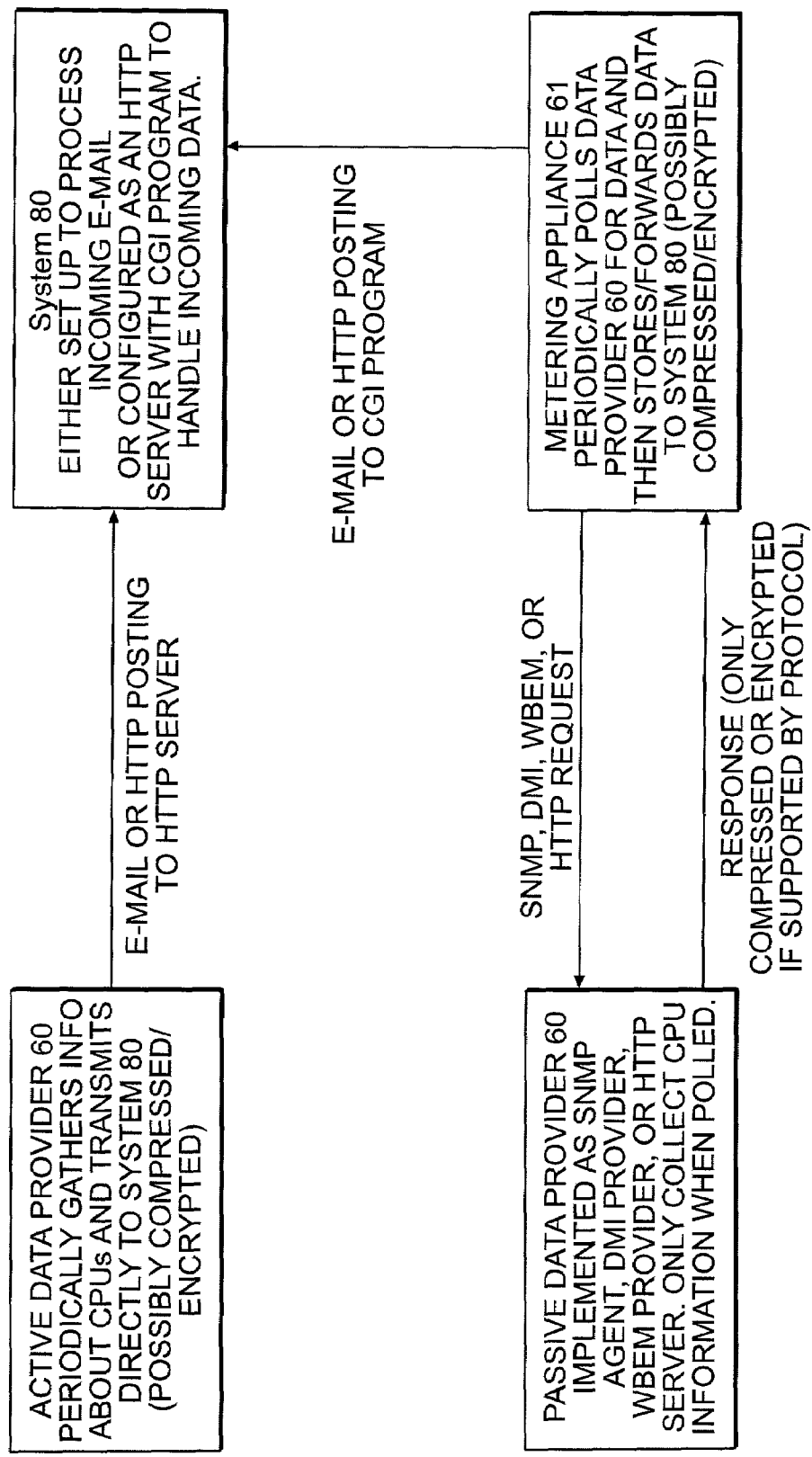
FIG. 3 illustrates embodiments of a data provider used with the cycle waster process.

As shown in FIG. 3, data provider 60, configured as an active device, which periodically receives CPU utilization data and transmits the received CPU data to the usage and accounting system 80. Data transmission can involve compression and encryption functions. The transmission of the received CPU data may be by e-mail or by HTTP posting to an HTTP server, for example. In these examples, the system 80 is either set up to process the incoming e-mail or is configured as a HTTP server with a CGI program to handle the incoming data. Also shown in FIG. 3 is data provider 60, configured as a passive device, which can be implemented as a SNMP agent, DMI provider, WBEM provider, or HTTP server. When configured as a passive device, the passive data provider 60 only receives CPU data when polled by a SNMP, DMI, WBEM, or HTTP request from metering appliance 61. The passive data provider 60 can provide a response that is compressed and encrypted. The metering appliance periodically poil the passive data provider 60 for CPU data, stored the received data, and forwards the received data to the system 80.

The operator of the computer 20 may use the work load manager 50 to specify a CPU utilization cap. For example, the operator may want to cap overall CPU utilization at 50 percent. This 50 percent cap means that the cycle waster processes will operate on 50 percent of the CPUs, and other processes operating on the computer 20 will compete for the remaining 50 percent of CPU resources. In the example illustrated in FIG. 1, a 50 percent CPU utilization cap would require two cycle waster processes. The cycle waster process may also be combined with a pay per use system that allows the user to activate and deactivate CPUs.

Figure 4:
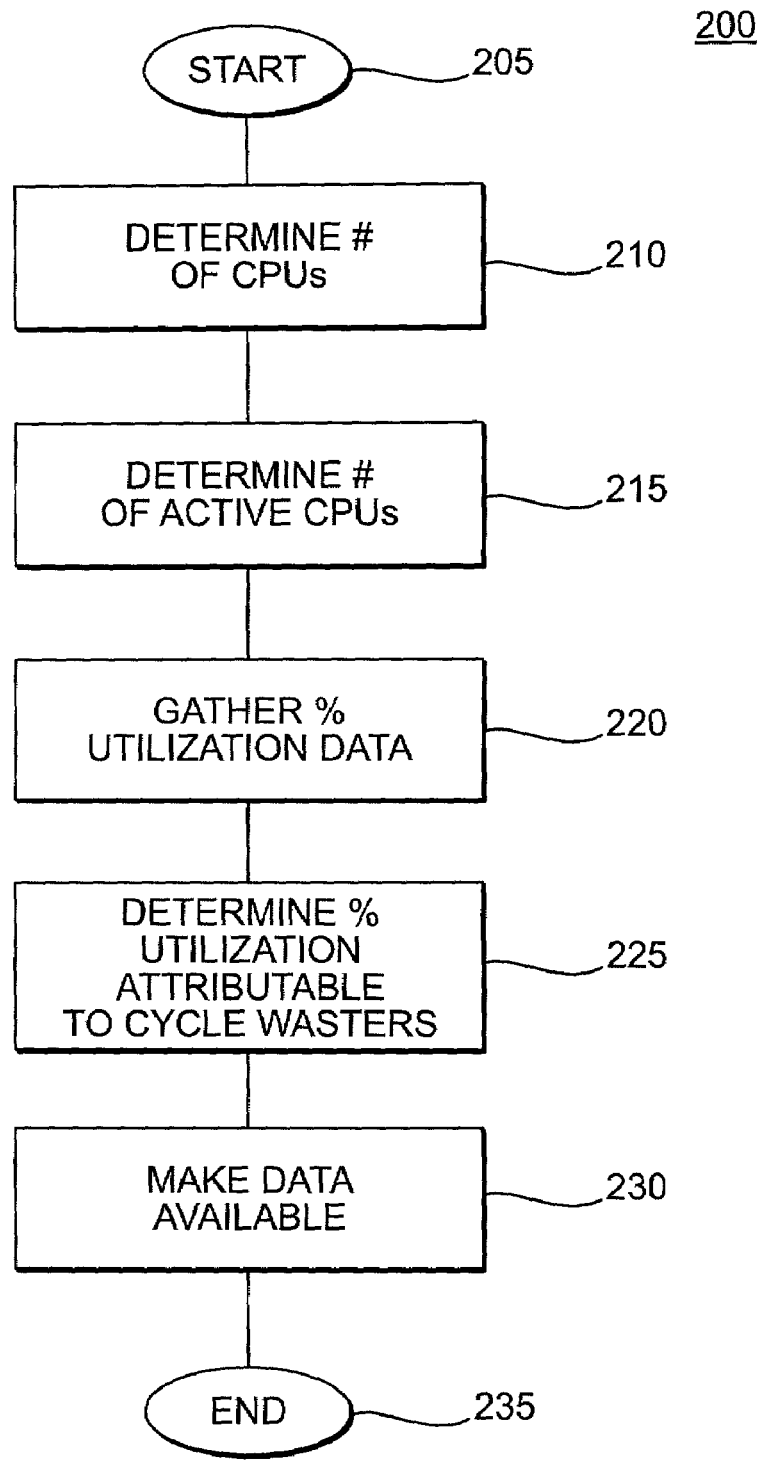
FIGS. 4–6 are flowcharts illustrating operations of the cycle waster process and the system of FIG. 1.
Figure 5:
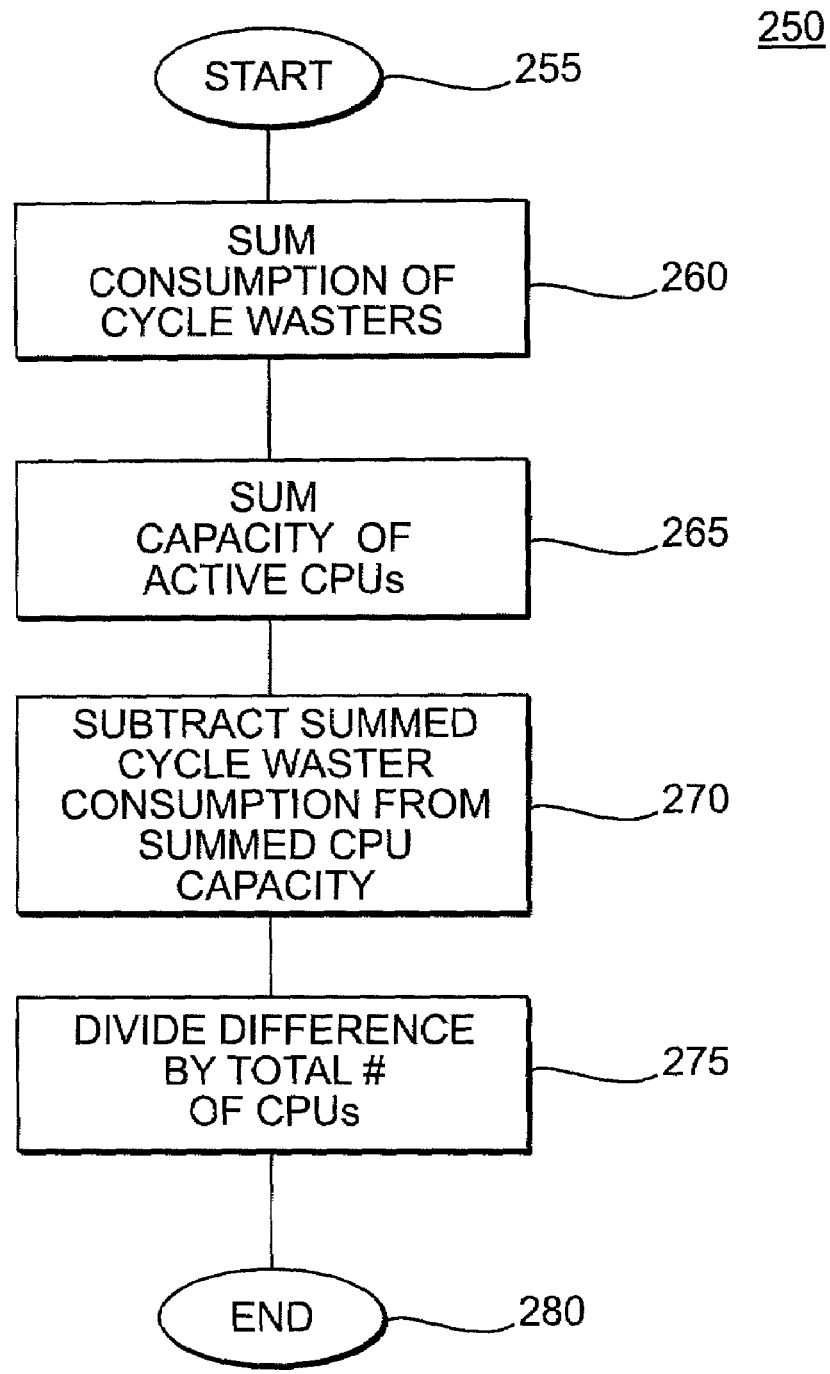
Figure 6:
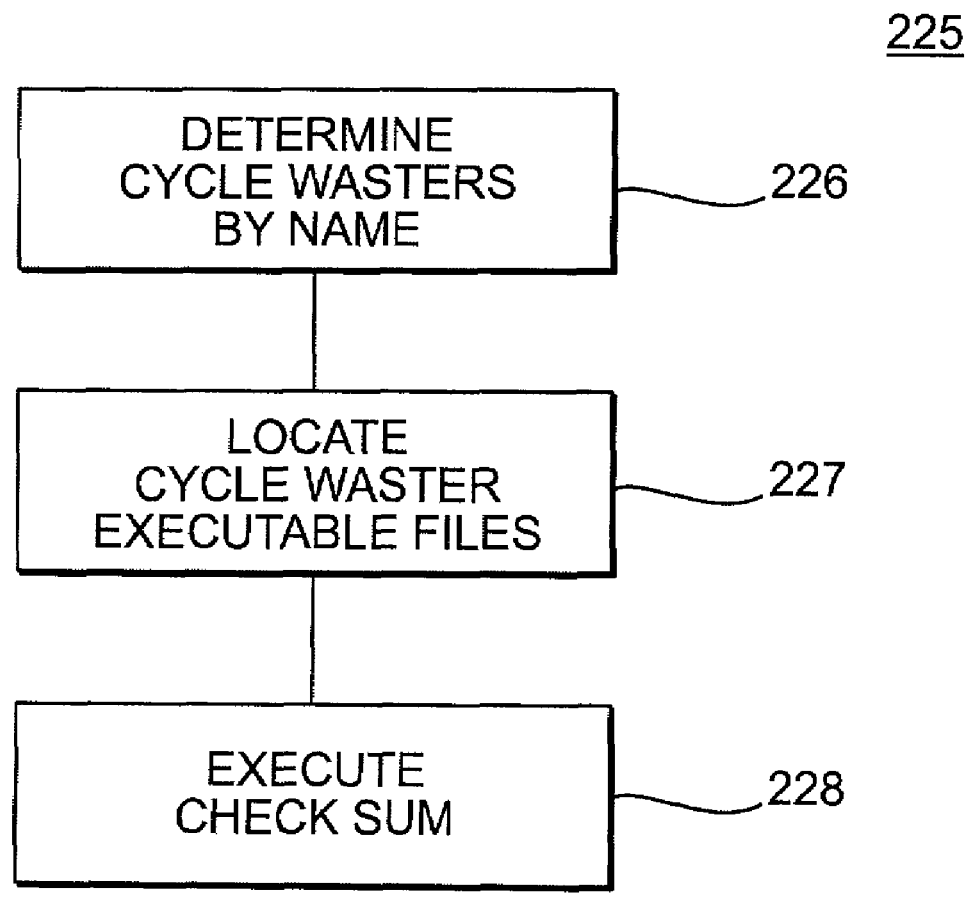

FIGS. 4–6 are flow charts that illustrate operations of a cycle waster process on the system 10 of FIG. 1. In FIG. 4, an operation 200 is illustrated that is used to measure CPU utilization in the computer 20. The operation 200 starts in block 205. In block 210, the data provider 60 determines the total number of CPUs in the computer 20. The total number of CPUs in the computer 20 may generally be a fixed number, or may vary. In block 215, the data provider 60 determines the number of active CPUs in the computer 20. In block 220, the data provider 60 gathers capacity, or consumption, statistics for each of the active CPUs (i.e., time when the CPUs were not idle) in the computer 20. For a CPU operating a cycle waster process, the consumption should be near 100 percent, assuming the cycle waster process operates during the data collection operation. Next, in block 225, the data provider 60 determines the percent CPU utilization due to cycle waster processes running on the CPUs. A method for determining the percent CPU utilization due to operating cycle wasters will be described with reference to FIG. 5. In block 230, the data provider 60 provides the thus acquired data to the system 80 either directly or as a result of being polled by the metering appliance 61. In block 235, the operation 200 ends.

FIG. 5 is a flow chart illustrating a computation and use operation 250 of the cycle waster process and the CPU utilization statistics gathered by the data provider 60. The operation 250 starts in block 255. In block 260, the data calculator 81 sums the percent consumption of each of the cycle waster process operating on the computer 20. In block 265, the data calculator 81 sums the capacity of all the active CPUs. In block 270, the data calculator 81 subtracts the total consumption for the cycle waster process from the total capacity for the CPUs. Next, in block 275, the difference is divided by the total number of CPUs in the computer 20 to generate an average percent utilization per CPU. The result approximates the actual CPU utilization of the computer 20. The CPU utilization may be expressed as a percentage, and the average CPU utilization may range from 0 to 100 percent. In block 280 the operation 250 ends. In another embodiment, this computation 250 may be done by the data provider 60. In yet another embodiment, this computation 250 may be done by the metering appliance 61. In still another embodiment only the CPU capacity consumed by non-cycle waster processes (and excluding idle time) is measured and used to computer CPU utilization.

FIG. 6 is a block diagram of the subroutine 225 for determining the percentage utilization attributable to cycle waster processes running on the computer 20 and involves identification and verification of cycle waster processes. The subroutine 225 begins in block 226 with the data provider 60 looking up a process table 40 entry for a cycle waster process by indexing into the process table 40 by either the name or identification number of the cycle waster process. In block 227, the data provider 60, uses information from this process table entry to locate the executable file associated with this cycle waster process. Next, in block 228, the data provider 60 executes a check sum to ensure that the identified cycle waster executable file is actually a recognized cycle waster executable file and not some other executable file performing an unknown operation. The subroutine 225 then ends.

While the apparatus, system, and method for processor utilization capping has been described with reference to the above embodiments, those of ordinary skill in the art will appreciate that various modifications can be made to the structure and function of the individual parts of the system 10 without departing from the spirit and scope the apparatus, system, and method as a whole.

The invention claimed is:

1. An apparatus for capping processor utilization in a computer system having one or more central processing units (CPUs), comprising:
   a scheduler coupled to each of the one or more CPUs;
   a process table coupled to the scheduler, wherein the process table includes identification information related to one or more application processes, and one or more cycle waster processes, and wherein the scheduler schedules a cycle waster process and the application process to operate on one or more of the one or more CPUs, wherein the cycle waster process consumes a percentage of processor resources and prevents other processes from using the percentage of processor resources; and
   a data provider that gathers processor data, wherein the gathered data includes CPU utilization data, and wherein the CPU utilization data is used to determine a charge for operation of the computer system,
   wherein a user can increase active processor resources by turning off one or more cycle waster processes, resulting in new data being transmitted to the data provider to produce a bill for the user.

2. The apparatus of claim 1, wherein a cycle waster process is bound to a CPU.

3. The apparatus of claim 1, wherein the scheduler assigns a cycle waster process to a CPU ad hoc.

4. The apparatus of claim 1, wherein each of the cycle waster processes has a first priority of operation and each of the application processes has a second priority of operation, and wherein the first priority is higher than the second priority.

5. The apparatus of claim 4, wherein the scheduler assigns a process to a CPU based on a priority of the process, whereby a cycle waster process is always scheduled ahead of an application process.

6. The apparatus of claim 1, further comprising a control to stop operation of an operating cycle waster process.

7. The apparatus of claim 6, wherein the control is automatic.

8. The apparatus of claim 6, wherein the control is manual based on a user input.

9. The apparatus of claim 1, further comprising a metering appliance that directs a polling operation of the data provider, whereby the data provider gathers the percentage utilization data.

10. The apparatus of claim 1, wherein the data provider gathers the CPU utilization data from each of the one or more CPUs, wherein each of the one or more CPUs runs one of the application process and the cycle waster process, or is idle.

11. The apparatus of claim 10, wherein the data provider provides the CPU utilization data to a remote location, and wherein the remote location computes an average utilization per CPU.

12. The apparatus of claim 11, wherein the average utilization per CPU is computed according to:
   (overall CPU utilization-cycle waster utilization)/(no. of CPUs).

13. A computer-implemented method for capping processor utilization in a computer system, comprising:
   implementing a cycle waster process in the computer system, wherein the cycle waster process consumes a percentage of processor resources and prevents other processes from using the percentage of processor resources; and determining the processor resources consumed by the cycle waster process, wherein a user can increase active processor resources by turning off the cycle waster process, resulting in new data being transmitted to a data provider to produce a bill for the user.

14. The method of claim 13, wherein the computer system is a multiprocessor computer system, and wherein utilization of processors in the computer system is determined by:

determining a total number of processors in the computer system; determining a number of active processors out of the total number of processors; and determining a total utilization of the active processors, wherein the utilization of a processor measures a time the processor executes application and/or system processes.

15. The method of claim 13, wherein the computer system is a multiprocessor computer system, and wherein utilization of processors in the computer system is determined by:

determining a number of active processors;

determining total processor utilization of the active processors, wherein the utilization of a processor measures a time the processor executes application and/or system processes; and subtracting the processor resources consumed by the cycle waster process from the total utilization of the active processors.

16. The method of claim 15, wherein data related to processor utilization is gathered periodically.

17. The method of claim 16, wherein the gathered data is provided to an external location.

18. The method of claim 13, wherein a processor operating a cycle waster processes has a near complete processor resource consumption.

19. The method of claim 18, wherein the gathered data is used to compute an average utilization per processor according to:

(overall processor utilization-cycle waster utilization)/(number of processors).

20. The method of claim 13, further comprising determining a number of operating cycle wasters, by:

identifying operating cycle waster processes by name; and verifying the operating cycle waster processes are valid cycle waster processes by executing a check sum operation.

21. The method of claim 13, further comprising assigning the cycle waster process a highest priority of any process in the computer system.

22. The method of claim 21, wherein the priority is assigned by a real time scheduler.

23. The method of claim 13, wherein designated ones of active processors operate a cycle waster process until occurrence of a specific event.

24. The method of claim 23, wherein the specific event is a manual intervention.

25. The method of claim 23, wherein the specific event is a predefined system metric.

26. The method of claim 13, wherein a cycle waster process is bound to a processor.

27. The method of claim 13, further comprising determining a charge for operation of the computer system based on the gathered data related to processors in the computer system.

28. A computer-implemented method for billing for active processor utilization in a multiprocessor computer system, comprising:

receiving data related to operation of active processors in the computer system, the data comprising:

a number of active processors a total capacity of the active processors, wherein a capacity of a processor measures a time the processor executes processes, and a portion of the total capacity of the active processors consumed by cycle waster processes executing in the active processors, wherein the cycle waster processes consume a percentage of processor resources and prevent other processes from using the percentage of processor resources;

computing an average utilization per active processor according to:

(total processor capacity-cycle waster consumption)/(number of active processors), wherein a processor runs one of a process and a cycle waster process or is idle, and wherein a process includes one of an application process and a system process; and enabling a user to increase active processor resources by turning off one or more cycle waster processes, resulting in new data being transmitted to a data provider to produce a bill for the user.

29. The method of claim 28, further comprising:

determining a total active processor utilization for the computer system;

generating a record of the total active processor utilization; and notifying a user of the computer system as to the total active processor utilization.

30. The method of claim 29, wherein the notifying step comprises providing the user with a bill.

31. A computer implemented method for capping central processor unit (CPU) utilization in a multi-CPU computer system, comprising:

determining a CPU utilization cap percentage;

installing a required number of cycle wasters on the computer system to achieve the CPU utilization cap percentage, wherein the cycle wasters consume a percentage of processor resources and prevent other processes from using the percentage of processor resources; and enabling a user to increase active processor resources by turning off one or more cycle wasters, resulting in new data being transmitted to a data provider to produce a bill for the user.

32. A computer implemented method for optimizing hardware billing in a multi-processor computer system, comprising:

determining a number of active processors in the computer system;

determining a desired utilization cap on the active processors;

installing a number of cycle wasters in the computer system to achieve the desired cap, wherein the cycle wasters consume a percentage of processor resources and prevent other processes from using the percentage of processor resources;

measuring active processor and cycle waster operation;

computing a bill based on the measurement; and enabling a user to increase active processor resources by turning off one or more cycle wasters, resulting in new data being transmitted to a data provider to produce a new bill for the user.

* * * * *